(12) United States Patent
Cashin et al.

(10) Patent No.: US 9,220,349 B1
(45) Date of Patent: Dec. 29, 2015

(54) CUP HOLDER ADAPTOR

(71) Applicants: James A Cashin, San Luis Obispo, CA (US); Gregory M. Chambers, San Luis Obispo, CA (US)

(72) Inventors: James A Cashin, San Luis Obispo, CA (US); Gregory M. Chambers, San Luis Obispo, CA (US)

(73) Assignee: James A. Cashin, San Luis Obispo, CA (US)

( * ) Notice: Subject to any disclaimer, the term of this patent is extended or adjusted under 35 U.S.C. 154(b) by 0 days.

(21) Appl. No.: 14/663,409

(22) Filed: Mar. 19, 2015

(51) Int. Cl.
  *A47K 1/08* (2006.01)
  *A47C 7/72* (2006.01)
  *F16B 2/04* (2006.01)
  *A47C 7/62* (2006.01)

(52) U.S. Cl.
  CPC ... *A47C 7/72* (2013.01); *A47C 7/62* (2013.01); *F16B 2/04* (2013.01)

(58) Field of Classification Search
  USPC ............ 248/311.2, 311.3, 313; 224/556, 558, 224/926; 220/737
  See application file for complete search history.

(56) References Cited

U.S. PATENT DOCUMENTS

| | | | | |
|---|---|---|---|---|
| 6,315,153 B1 * | 11/2001 | Osborn | ............... | A47G 23/0216 220/737 |
| 6,827,318 B1 * | 12/2004 | Hsu Li | ................... | B60R 11/00 224/558 |
| 8,757,572 B1 * | 6/2014 | Starr | ...................... | B60N 3/10 224/556 |
| 2005/0082455 A1 * | 4/2005 | Jones | ..................... | B60N 3/107 248/311.2 |
| 2006/0118688 A1 * | 6/2006 | Kong | ..................... | B60N 3/108 248/311.2 |
| 2007/0221805 A1 * | 9/2007 | Baek | ..................... | B60N 3/106 248/311.2 |
| 2009/0173862 A1 * | 7/2009 | Lota | ........................ | B60N 3/10 248/311.2 |

* cited by examiner

*Primary Examiner* — Steven Marsh
(74) *Attorney, Agent, or Firm* — Andra M. Vaccaro

(57) ABSTRACT

An adapter for an existing cup holder in a theater for easily mounting a closed captioned device having a mounting rod or gooseneck while still providing the patron with a cup holder, comprises a base having a top side and a bottom side and at least two holes therein, wherein the mounting rod of the closed captioned device is mounted into the corresponding hole in the base, a cylindrical cup holder having an integral adjustment screw extending from the bottom thereof, which is fed through a corresponding hole in the base; and a clamping mechanism which moves in relation to the movement of the adjustment screw for temporarily clamping the adapter to the existing cup holder. When the cup holder is turned in a first direction, the clamping mechanism fixedly mounts the adapter into the existing cup holder. The adaptor may be removed by turning the cup holder in the opposite direction. Instead of or in addition to providing another cup holder, the patron may be provided with a tray, table, electronics holder or other accessory by using an accessory adaptor. Further, the adapter may be mounted to an armrest by turning the accessory holder so that it clamps onto the armrest.

19 Claims, 7 Drawing Sheets

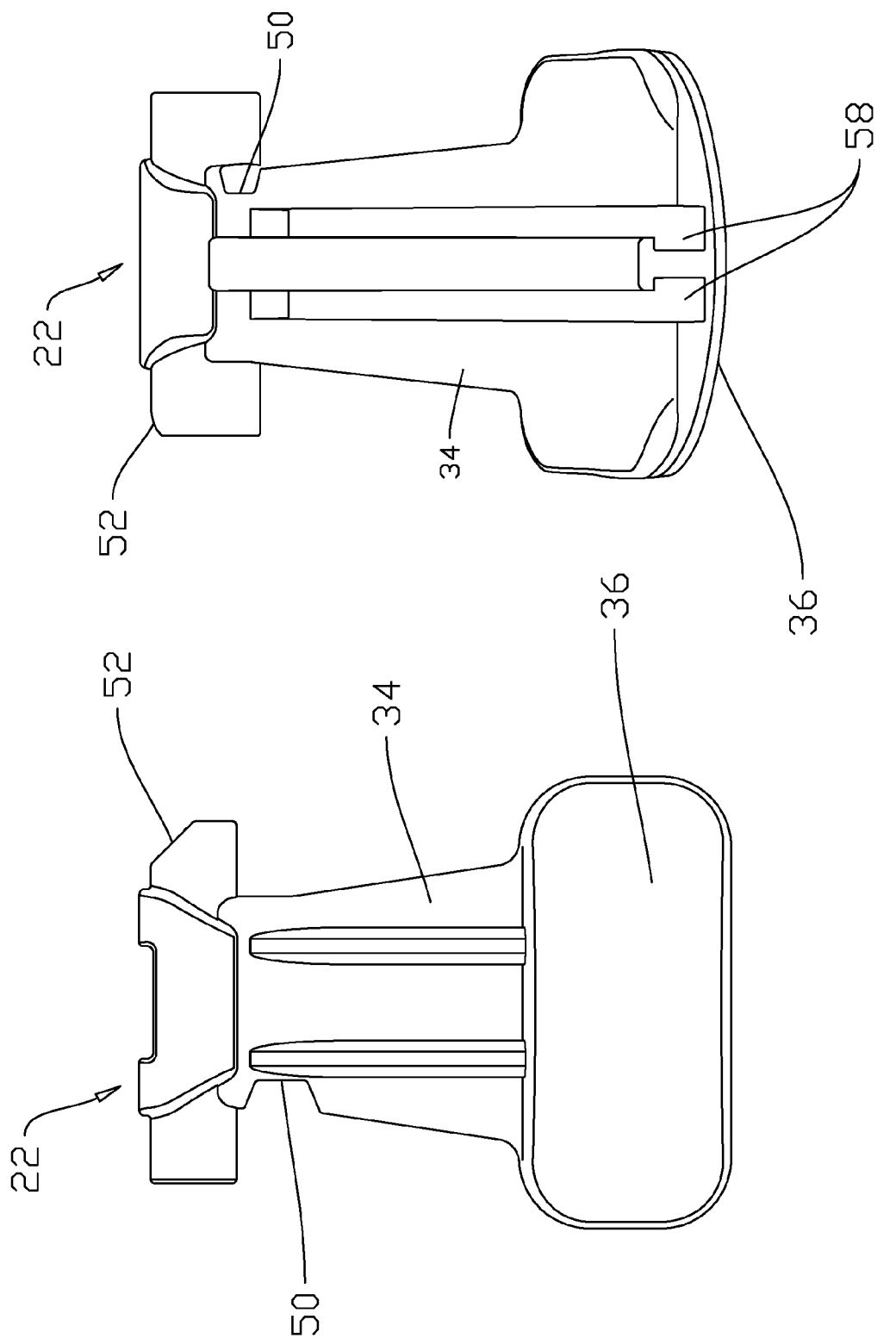

ics holder or other type of holder to the base. In order to be ADA complaint, the adapter when fully mounted will not hinder emergency egress.

CUP HOLDER ADAPTOR

This invention relates to cup holders used in theaters and other venues.

BACKGROUND OF THE INVENTION

Cup holders that are attached to armrests of seats to hold drinks are well known in the art. They may be used in theaters, at various venues including, but not limited to, sporting and concert venues, arenas, auditoriums, in cars and anywhere else that a cup holder may be needed (hereinafter all such venues shall be interchangeably referred to as "venues."). The cup holders may be permanently or semi-permanently attached to armrests or to a table adjacent to a seat. Cup holders also may vary in shape, diameter and depth.

With the passing of the 1990 Americans with Disabilities Act, Title III requirements, closed captioning (CC) and second language (SAP) features were added to many movies and venue events to provide patrons with hearing impairments the ability to enjoy the programs/movies/entertainment. Closed captioning (CC), for example, displays text for a patron. In a public venue, the text display may be distracting to non-accommodated patrons so that it is preferable that it does not appear on the audience screen nor be displayed in a manner that disturbs patrons adjacent or behind the accommodated patron or disturbs or block their view. Thus, a closed captioning device in intended to be visible to the accommodated patron only.

To comply with mandated ADA requirements, venues must provide captioning devices that take into account the variations in patrons' heights, obstructions of aisle access, obstructions or interferences with the views of other patrons, costs and the ability of a patron to install and adjust the display device. Some display devices are mounted on an adjustable gooseneck or support rod that then must be mounted to the patron's chair and adjusted according to the optimal location for the viewer or attached by some other means.

Since most movie theaters and many venues include cup holders, some close captioning devices use an existing cup holder located in or adjacent to the patron's seat to secure the closed captioning or SAP device. Since some closed captioning display devices are top heavy, a cup holder may lack sufficient stability to support the display device. In addition, cup holders can vary in diameter and depth so that some display devices may not fit into the existing cup holders. In some instances, it may be difficult for a patron to install a closed captioning display device into a venue's cup holder by him/herself.

In order to be ADA compliant in the United States, a mounted closed captioning device must not interfere with the ingress and egress of the patron using the device nor any of the other patrons in the venue should an emergency evacuation of the venue be required.

Further, when a closed captioning device is mounted within an existing cup holder of a patron, that patron will no longer be able to use that cup holder to hold his or her drink. Thus, there is a need for an adaptive cup holder device that can hold a closed captioning device and still provide a cup holder for drinks while still being ADA compliant.

With the advent of more sophisticated food and drink offerings at various venues, there also is need for a cup holder than can hold items in addition to drinks or display devices without having to replace the entire existing cup holder.

The present invention addresses the need of an hearing impaired ADA venue patron by providing a portable, adjustable, self-installable adapter that can securely grip the inside of an existing cup holder which provides both a secure attachment for a closed captioned or SAP device and a new cupholder so that there is no inconvenience to the hearing impaired patron at all caused by the use of the closed captioned or SAP device.

SUMMARY OF THE INVENTION

The present invention is an adapter for an existing cup holder in a theater for easily mounting other accessory devices. By way of example and not limitation, the adapter of the present invention comprises a base which can rigidly mount accessory devices such as a closed captioned device as well as provide other accessories such as, but not limited to, a replacement cup holder. The present invention easily can be temporarily and securely attached to and detached from an existing cup holder or armrest.

A preferred embodiment of the present invention comprises a base having a top side and a bottom side and at least two holes therein, wherein one of the holes is used to mount the rod or gooseneck of a close captioned device. A cup holder or other accessory having an integral adjustment screw extending from the bottom thereof is fed through the other hole in the base. A clamping mechanism is fixedly attached to the base and movable mounted onto the adjustment screw for temporarily clamping the adapter to an existing cup holder. When the adapter cup holder or other accessory is turned in a first direction, the clamping mechanism opens and when it is turned in a contrary direction, it closes. In a preferred embodiment, when the clamping mechanism opens, it creates friction against the sides of an existing cup holder thereby holding the adapter in place such that the adapter is temporarily securely mounted in the existing cup holder. The adaptor may be later removed by turning the adapter cup holder in the opposite direction. In an alternative embodiment where there is no existing cup holder, the adapter is temporarily securely mounted onto an armrest or other stationary area, by turning the accessory holder so that the clamping mechanism can grasp onto the armrest or other stationary area. The adapter may later be removed by turning the accessory holder in the opposite direction to release the clamping mechanism.

In a preferred embodiment, the clamping mechanism comprises a plurality of preferably equi-spaced pivot assemblies that can pivot open and close. The pivot assemblies comprise a plurality of pivot arms which are movably attached to the bottom of the base on the end closest to the base. The clamping mechanism also includes a threaded drive hub that is moveably mounted onto the integral adjustment screw that extends from the bottom of the base. The drive hub has a plurality of arms that in a preferred embodiment correspond in number to the number of pivot arms moveably attached to the base. In a preferred embodiment, there is at least one tooth extending from each of the arms of the drive hub. In that preferred embodiment, each of the pivot arms has at least one channel into which the tooth or teeth of the corresponding drive hub arm can travel. In alternate embodiments of the present invention, the adaptor further comprises an accessory adaptor for mounting a tray, table, box, electronics holder or other type of holder to the base. In order to be ADA complaint, the adapter when fully mounted will not hinder emergency egress.

BRIEF DESCRIPTION OF THE DRAWINGS

FIG. 5 is an exterior plan view of a preferred flap of the present invention.

FIG. 6 is an interior plan view of the preferred flap of the present invention shown in FIG. 5.

DETAILED DESCRIPTION OF THE INVENTION

Figure 1:
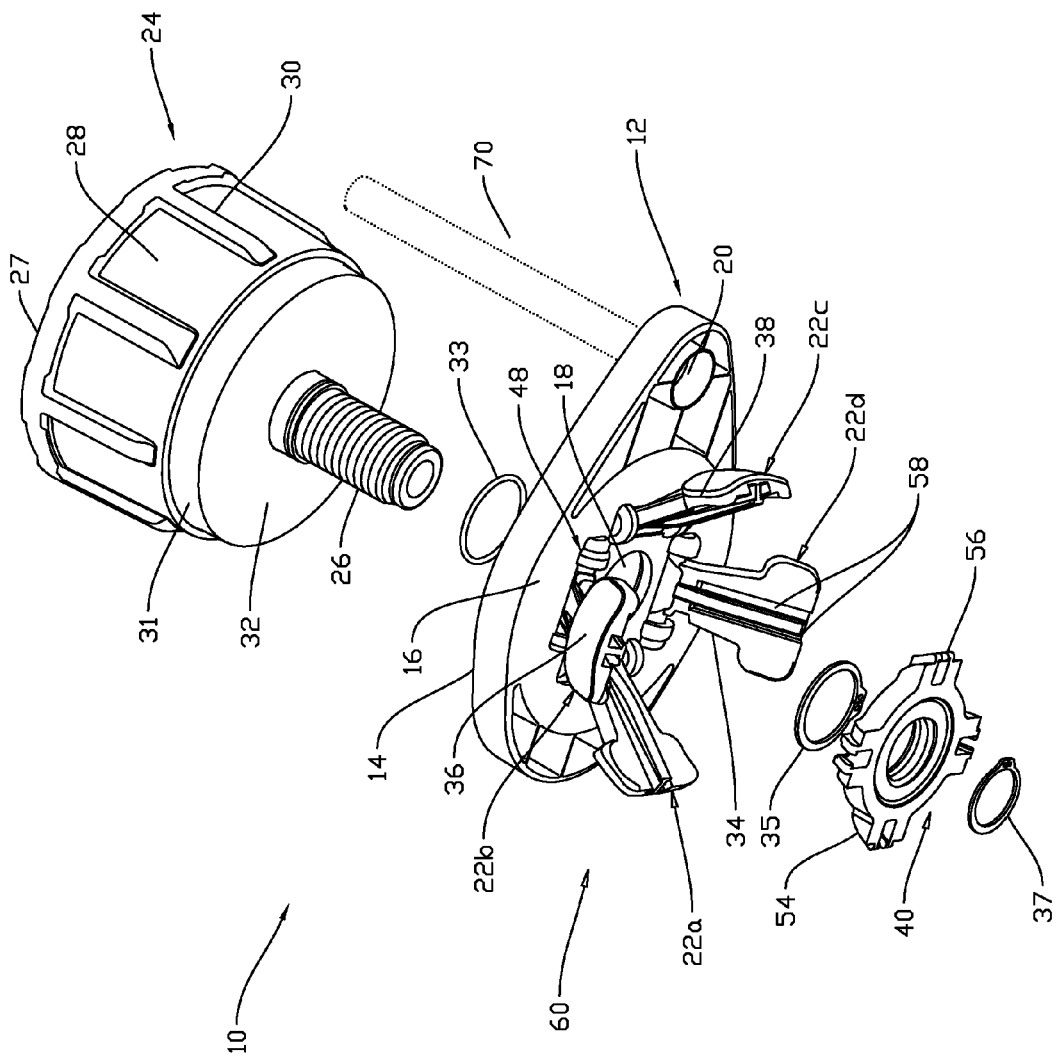
FIG. 1 is an exploded perspective view of a preferred embodiment of a cup holder adapter according to the present invention where the top is shown on the right side of FIG. 1 and the bottom is shown on the left side of FIG. 1.

Referring to FIGS. 1-6, a preferred embodiment of a cup holder adapter 10 of the present invention is shown. In FIG. 1, cup holder adapter 10 comprises a base 12 having a top 14 and a bottom 16 and which, in a preferred embodiment of the present invention, has two holes 18 and 20 extending through the top 14 and bottom 16 thereof. In alternate embodiments (not shown), the base 12 may have just one hole, no holes or multiple holes going therethrough. In a preferred embodiment, the base 12 may be teardrop-shaped (as shown) or a rounded diamond shape; however, any shape that provides a means for securing the adapter of the invention to an existing cup holder while also being capable of supporting a closed captioned display device and/or one or more other accessory holders, so that all may be used. In alternate embodiments, the base could have a different shape to accommodate other accessories such as a tray, table or some other structure that can hold concession or other items for the user.

Referring more particularly to FIGS. 1, 2, 3, 4, 7 and 8 which show an embodiment in which a closed captioned device is mounted to the adapter, a mounting hole 20 in base 12 is used for securely mounting a gooseneck or a support rod 70 for a close captioned device (not shown). In a preferred embodiment the gooseneck or support rod 70, may be secured to the base through a screw (not shown) mounted through the base. Alternatively, when a closed captioned device is not used, mounting hole 20 may be used to temporarily and securely mount other types of accessories to the base 12. Alternatively, there may be other holes placed in the base to attach accessories in addition to a closed captioned device.

Figure 2:
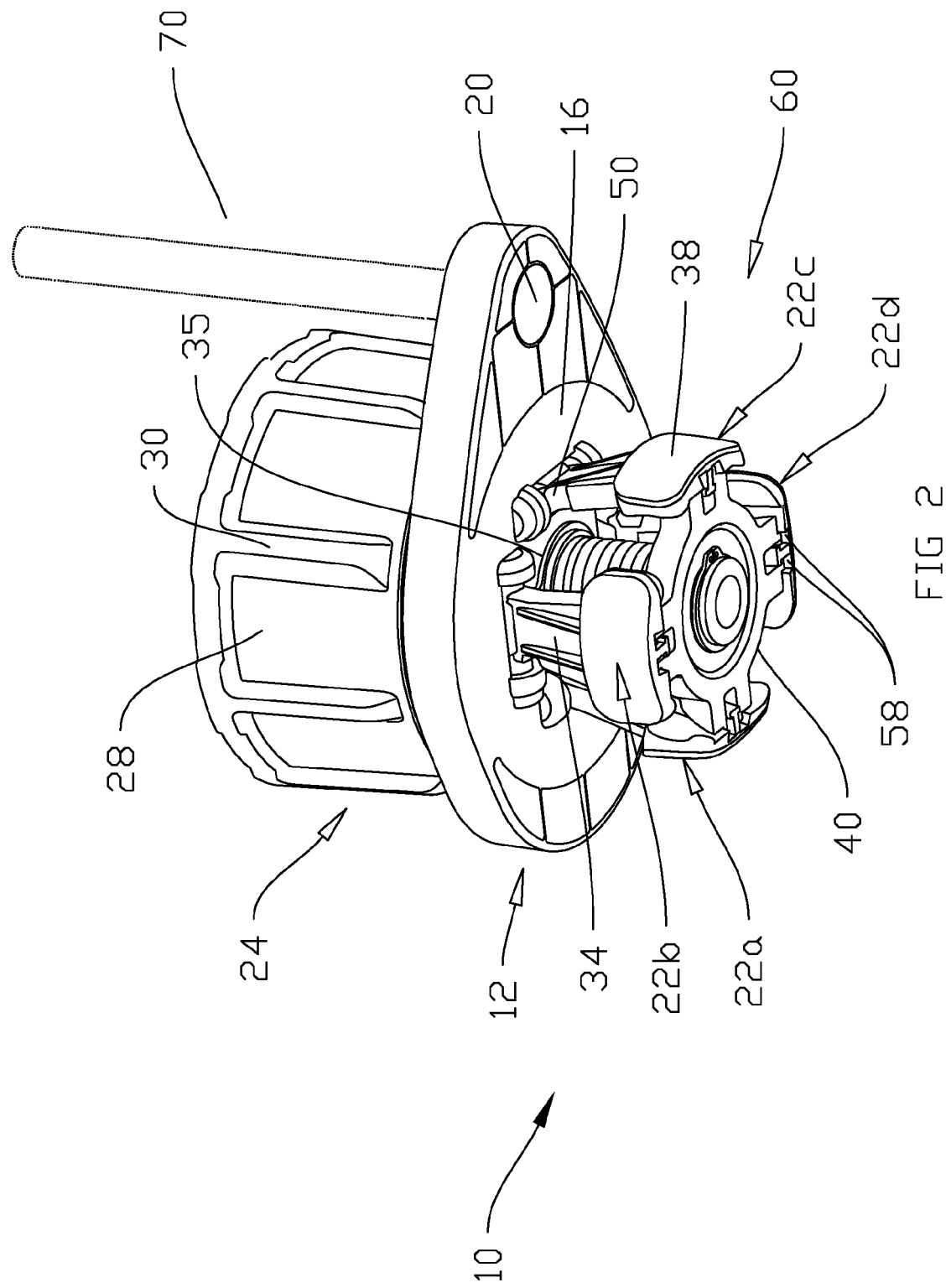
FIG. 2 is a perspective view of an assembled preferred embodiment of the present invention in which the bottom flaps are in a fully closed position.
Figure 3:
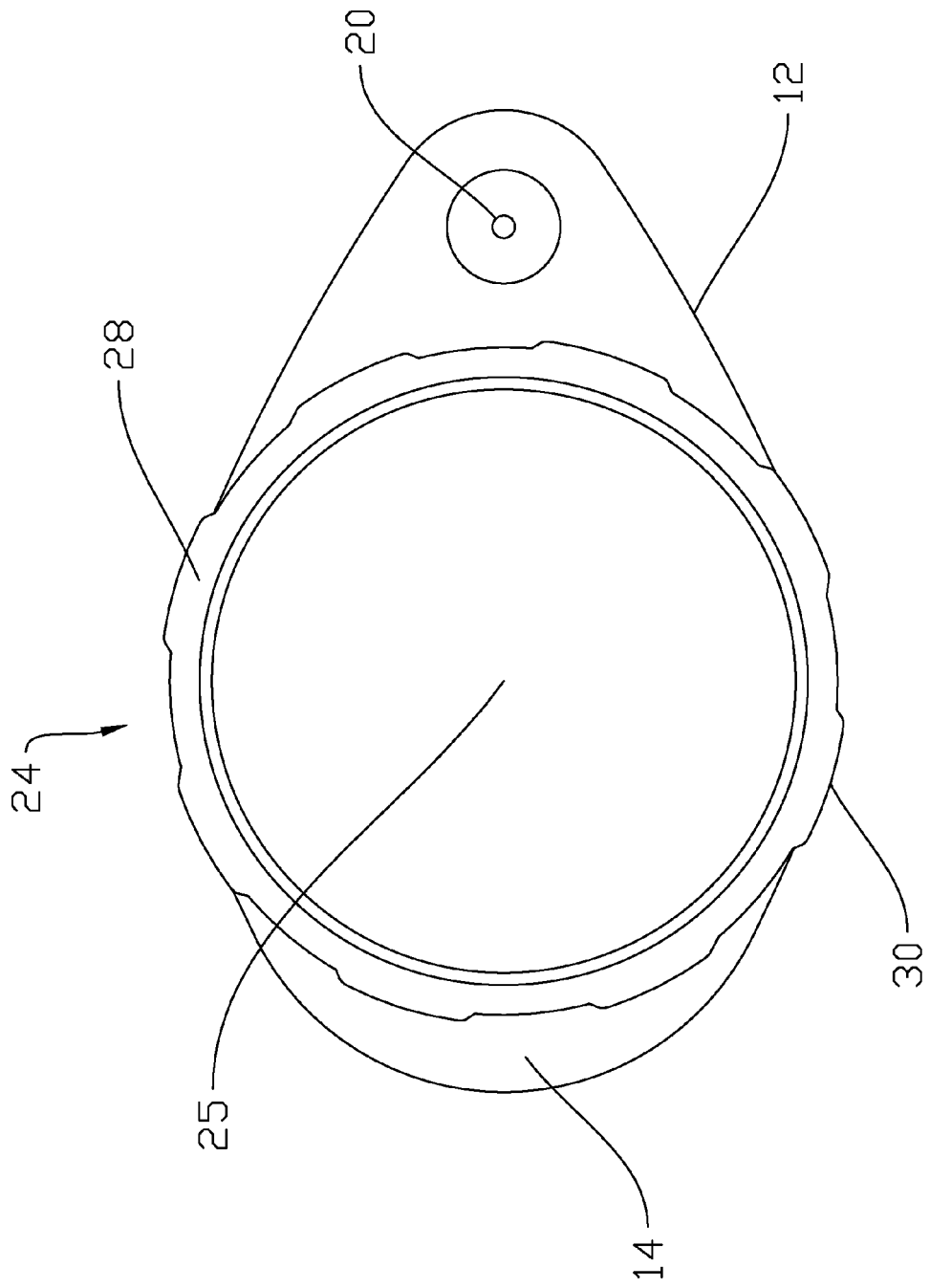
FIG. 3 is a top plan view of a preferred embodiment of the present invention.
Figure 4:
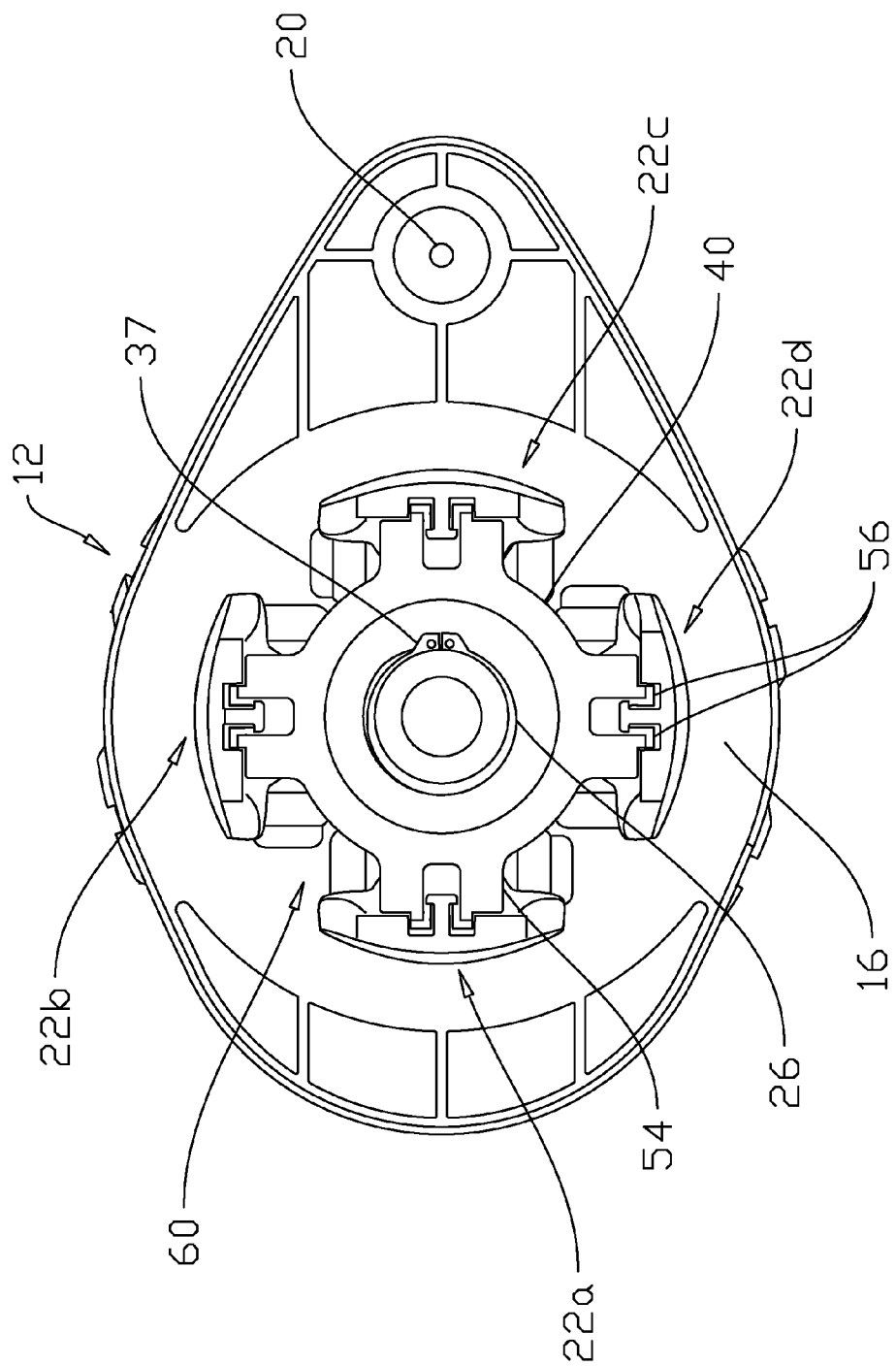
FIG. 4 is a bottom plan view of a preferred embodiment of the present invention showing the bottom flaps in a closed position.

In a preferred embodiment such as shown in FIGS. 1-7, the cup holder adapter 10 of the present invention also comprises an accessory holder 24. In a preferred embodiment, holder 24 is either cylindrical or tapered into the shape of a cup, although any shape capable of holding a large soft drink, other concession stand purchase or any other type of item may be used. In a preferred embodiment, holder 24 comprises a circular inside bottom 25 (such as shown in FIG. 3) which is surrounded by a circular wall 28 that together form a cylindrical compartment for holding a cup, soda can or other object. In a preferred embodiment, on the open end 27 of holder 24, the circular wall 28 has elevations 30 on the outside thereof. The elevations 30 make the holder 24 easier to grasp and turn for someone with poor manual dexterity. In a preferred embodiment, the elevations 30 are mounted equal distances around the circumference of the wall 28.

In a preferred embodiment, proximate the outside bottom 32 of holder 24, the holder 24 is indented (as reflected by the area 31 on holder 24) so as to fit within a reciprocal indention (not shown) in the top 14 of base 12, such that the non-indented portion of holder 24 will rest on the top of base 12 when it is fully assembled. In alternate embodiments, no indentions are required.

Figure 7:
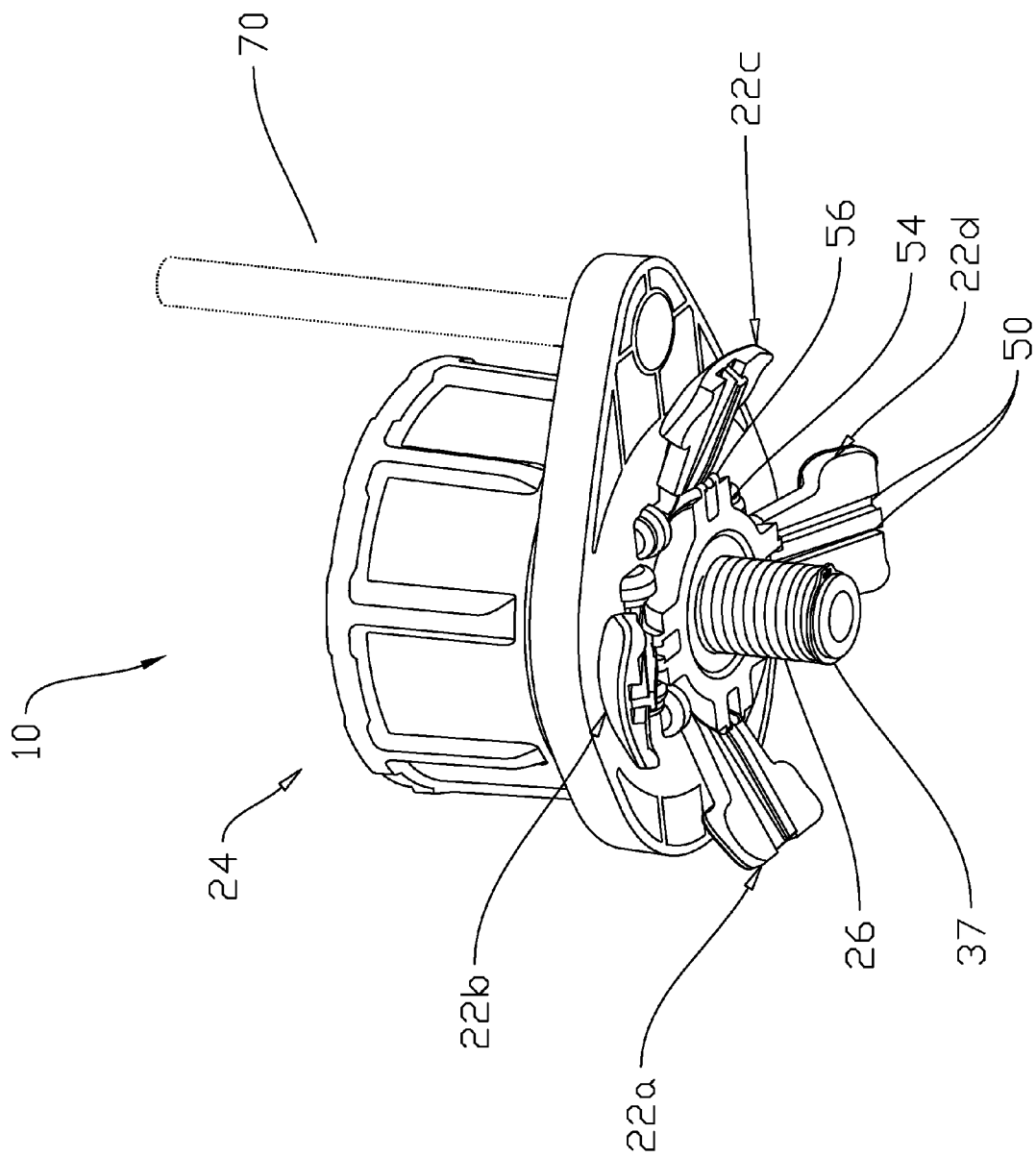
FIG. 7 is a perspective view of a preferred embodiment of the present invention showing the bottom flaps in an opened position.

In a preferred embodiment, at the center of bottom 32 of a holder 24, there is an integral adjustment screw 26 extending from therefrom. In a preferred embodiment, the integral adjustment screw 26 is fed through an opening 18 in base 12 so that screw 26 extends through the base and extends from the bottom 16 of base 12 (as shown in FIGS. 2 and 7.) In a preferred embodiment such as shown in FIG. 1, an O-ring 33 is placed around the integral adjustment screw 26 between the top 14 of base 12 and the bottom of holder 24. In a preferred embodiment, the O-ring 33 cushions the holder 24 and also provides friction against the loosening of the clamping mechanism 60 as described in more detail below.

In a preferred embodiment such as shown in FIG. 1, the holder 24 with integral adjustment screw 26 and O-ring 33 are held in place in base 12 by another O-ring 35.

In a preferred embodiment such as shown in FIGS. 2 and 7 (see also FIGS. 5 and 6), the cup holder adapter 10 also comprises a clamping mechanism 60 located on the underside thereof. In a preferred embodiment, the clamping mechanism comprises a plurality of pivot arm assemblies 22 *a, b, c* and *d* which are mechanically mounted to the bottom 16 thereof proximate to hole 18 and a drive hub 40, although any mechanically controllable clamping mechanism may be used that can extend and withdraw so as to hold the adapter 10 in place within an existing cup holder.

Figure 8:
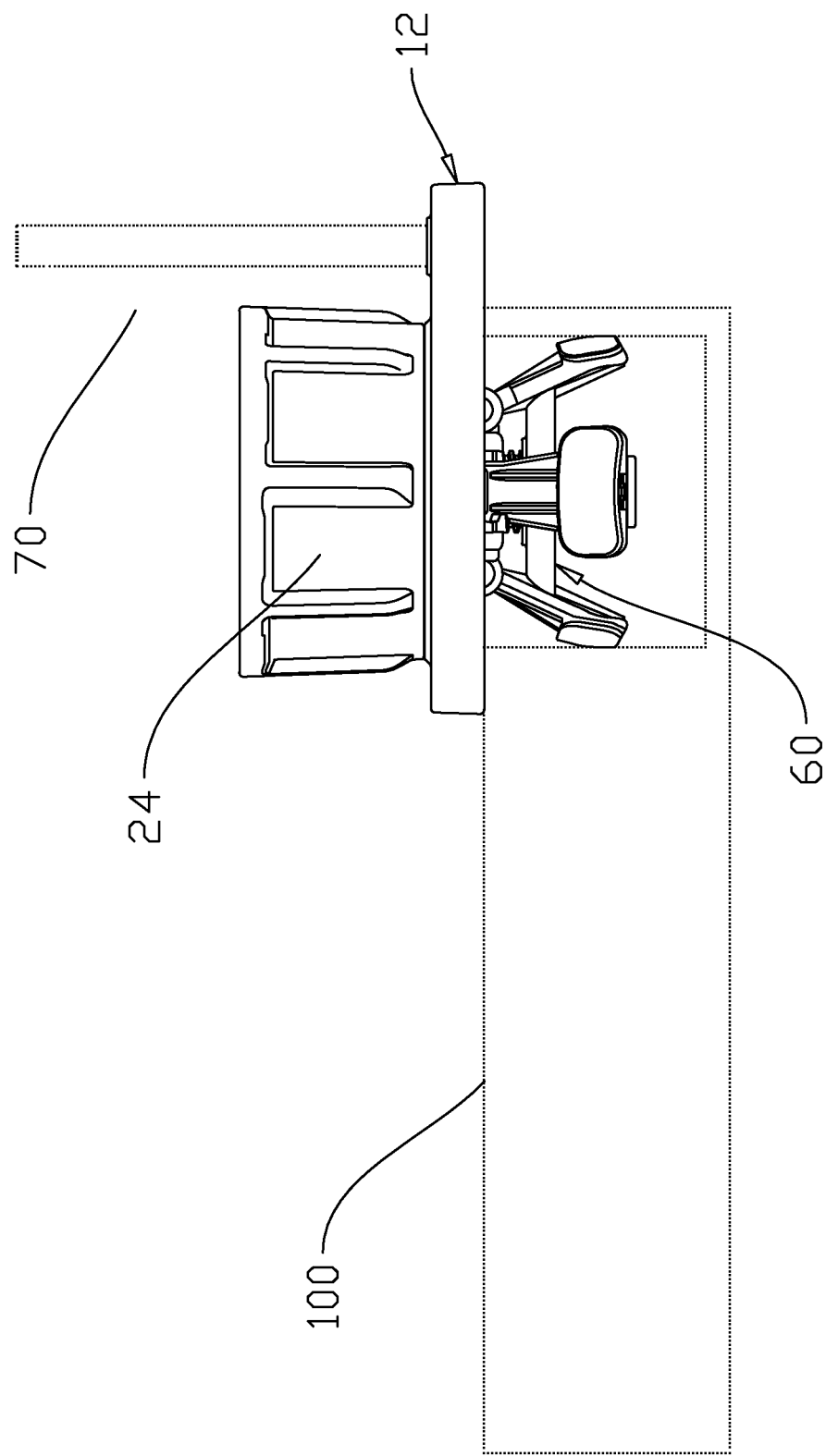
FIG. 8 is a cross-sectional side open view of a preferred embodiment of the adapter of the present invention installed into an existing cup holder in a venue, wherein the existing cup holder and arm in which the cup holder is installed are shown in phantom.

In a preferred embodiment, each pivot arm assembly 22 comprises a pivot arm body 34 and a pivot arm pad 36 at the bottom thereof. In a preferred embodiment, the pivot arm body 34 and the pivot arm pad are one piece. In a preferred embodiment, each pivot arm pad 36 is shaped so that the outside 38 thereof will rest against the inside surface of any cylindrical or square cup holder such as is shown in FIG. 8. The pivot arm pad 36 provides both cushioning and retention friction when an assembled cup holder adapter 10 is installed into a cup holder as also shown in FIG. 8. In a preferred embodiment, the pivot arm pad may be comprised of rubber, or plastic or any other material that will not degrade significantly over repetitive use and which will adapt to minor surface variations.

In a preferred embodiment such as is shown in FIGS. 5 and 6, the pivot arm assemblies 22 are mounted into pivot retainers 48 which are molded into the bottom 16 of base 12. The pivot arm assemblies include a notch 50 and bevel 52 arrangement such that one side of the top of the assembly can be slipped into a pivot retainer and then the other side can be slipped into the corresponding pivot retainer for that arm so that the arm can be locked into place without the need for any tools. In alternative embodiments, other known methods of creating a pivoting arm can be used.

In preferred embodiments such as are shown in FIGS. 1, 2, 4 and 7, the drive hub 40 of clamping mechanism 60 has a threaded center hole which is threaded onto the end of the integral adjustment screw 26. In a preferred embodiment, the drive hub 40 has at least 4 arms 54 extending perpendicular therefrom. In a preferred embodiment, each drive arm 54 comprises one or more teeth 56 extending from the end thereof. In a preferred embodiment, drive hub 40 has two teeth 56 extending from the end thereof as shown in FIGS. 1, 2, 4 and 7. In an alternative preferred embodiment (not shown), there is only one tooth 56 extending from the middle of the end of each arm 54. In other alternative embodiments, only some of the drive hubs arms have teeth or may have no teeth extending therefrom.

On the inside of each of the pivot arm assemblies 22, there are one or more guide tracks 58 into which a corresponding tooth 56 on the end of each of the corresponding arms 54 of the drive hub 40, travels. In alternative embodiments in which the drive hub arms have no teeth, the end of the arms are shaped so that they may fit entirely within the guide track.

When the cup holder assembly 24 of adapter 10 is turned towards the base (which in a preferred embodiment is clockwise), the drive hub 40 travels up adjustment screw 26 towards the bottom 16 of base 12 causing the pivot arm assemblies 22 to be forced outwards. As the drive hub 40 travels away from the base 12 (which in a preferred embodiment is counterclockwise), the pivot arm assemblies 22 start to close inwardly. A retention O-ring 37 is placed at the bottom of adjustment screw 26 to prevent the threaded drive hub 40 from detaching from the adjustment screw 26 and to keep teeth 56 from coming out of the guide tracks 58 in pivot arms 22.

When the cup holder adapter 10 of the present invention is used, it is installed into an existing cup holder by placing the adapter 10 directly on top of an existing cup holder, such as is shown in FIG. 8. In a preferred embodiment, a close captioned device is already attached thereto. The adapter 10 is temporarily securely mounted to the existing cup holder by turning the holder 24 in a direction (which in a preferred embodiment is clockwise) that causes the threaded drive hub 40 to move upward until it can no longer be turned. The turning motion forces each of the pivot arm assemblies 22 outward against the existing cup holder inside walls, thereby clamping the present invention into an existing cup holder. To remove the cup holder adapter the adapter is turned in an opposite direction (which in a preferred embodiment is counterclockwise), which drives the threaded drive hub 40 downward thereby releasing the clamping pressure and making it so that the adapter may be removed.

In an alternate preferred embodiment instead of a cylindrical cup holder assembly 24 such as is shown in FIGS. 1-8, the holder may be, but is not limited to, a folding or rigid tray table, a popcorn holder, an electronics holder, or other accessory or food holder that a patron may require provided it either has an integral adjustment screw such as screw 26 or there is an accessory adapter having an integral adjustment screw that can be moved in a clockwise and counterclockwise direction to open and close a clamping mechanism 60 affixed to the bottom thereof for temporarily and securely mounting the holder to an existing cup holder.

Once assembled, one of the advantages of the present invention is that it does not require the use of any tools to be installed by a user. Another advantage is that it does not require venues to replace their existing cup holders to comply with ADA rules. A further advantage is that the adapter provides a replacement cup holder as well as a base for mounting a closed captioned display or other accessory(s).

An alternative embodiment of the present invention (not shown) provides for inclusion of an additional or alternative mounting hole for mounting other accessories such as a tray, table, box or other type of holder that does not hinder emergency egress.

In a further alternative embodiment of the present invention (not shown), the clamping mechanism and the installation of the drive hub are reversed so that the adapter can clamp onto an armrest or other stationary support device that does not have an existing cup holder. This alternative embodiment provides a cup holder or stable means to attach another accessory where none previously existed.

Although the invention is intended for theater use, the invention may have other applications. By way of example and not limitation, the adapter of the present invention may be used in a vehicle to provide a cup holder. In addition, it can also be used in a vehicle to mount a close captioned device in a car by mounting it within the vehicle's cuphholder.

The presently disclosed embodiments are to be considered in all respects as illustrative and not restrictive, the scope of the invention being indicated by the appended claims rather than the foregoing description, and all changes which come within the meaning and range of equivalency of the claims are therefore intended to be embraced therein. The embodiments and methods described above are exemplary embodiments and methods of the present invention. And while these particular embodiments and techniques of the present invention have been shown and illustrated herein, it will be understood that many changes, substitutions and/or modifications may be made by those persons skilled in the art. It will be appreciated from the above description of presently preferred embodiments and techniques that other configurations and techniques are possible and within the scope of the present invention. Thus, the present invention is not intended to be limited to the particular embodiments and techniques specifically discussed hereinabove.

The invention claimed is:

1. An adapter for an existing cup holder in a theater for temporarily mounting a closed captioned device having a mounting rod or gooseneck, comprising:
   a base having a top side and a bottom side and at least two holes therein, wherein the mounting rod of the closed captioned device is mounted into a corresponding hole in the base;
   a cup holder having an integral adjustment screw extending from the bottom thereof, which is fed through the corresponding hole in the base;
   a clamping mechanism which moves in relation to the movement of the adjustment screw for temporarily clamping the adapter to the existing cup holder;
   whereby when the cup holder is turned in a first direction, the clamping mechanism opens such that the adapter is temporarily securely mounted into the existing cup holder and whereby the adaptor may be removed by moving the cup holder in a direction opposite the first direction.

2. The adapter of claim 1 wherein the clamping mechanism comprises a plurality of equi-spaced pivot assemblies which can open and close to respectively mount and remove the adapter from the existing cup holder.

3. The adaptor of claim 2 wherein the pivot assemblies comprise a plurality of pivot arms, each arm having a proximal end and a distal end, wherein the distal ends of each arm comprise mounting pads, whereby each pivot arm is pivotably mounted to the bottom of the base at its proximal end, which is the end closest to the base.

4. The adapter of claim 1 wherein the clamping mechanism comprises a plurality of equi-spaced pivot arms, each are having a proximal and a distal end with a center portion extending between the ends, which are pivotably mounted at the proximal ends to the bottom of the base, each pivot arm having at least one guide channel extending along the center portion thereof, and a drive hub which is moveable threaded onto the integral adjustment screw, the drive hub comprising arms corresponding to the number of pivot arms, wherein the arm of each drive hub arm travels up and down within the corresponding guide channel in the corresponding pivot arm.

5. The adapter of claim 1, further comprising an accessory adaptor for mounting a tray, table, box, electronics holder or other type of holder.

6. An adapter for mounting a closed captioned device having a mounting rod or gooseneck, comprising:
- a base having a top side and a bottom side and at least two holes therein, wherein the mounting rod of the closed captioned device is mounted into a corresponding hole in the base;
- an accessory having an integral adjustment screw extending from the bottom thereof, which is fed through a corresponding hole in the base;
- a clamping mechanism which moves in relation to the movement of the adjustment screw for temporarily mounting the adapter to another object;
- whereby when the accessory is turned in a first direction, the clamping mechanism opens such that the adapter is clamped onto the other object and whereby the adaptor may be removed by moving the accessory in a direction opposite the first direction.

7. The adapter of claim 6 wherein the clamping mechanism comprises a plurality of pivot assemblies which can fixedly open and close.

8. The adaptor of claim 7 wherein the pivot assemblies comprise a plurality of pivot arms, each arm having a proximal end and a distal end, wherein the distal ends of each arm comprise mounting pads and means for mounting the pivot arms to the bottom of the base on the proximal ends which are the ends of the pivot arms closest to the base.

9. The adapter of claim 6 wherein the clamping mechanism comprises a plurality of pivot arms which have a channel into which a teeth of a drive hub can travel, the drive hub being moveably threaded onto the integral adjustment screw.

10. The adapter of claim 6, wherein the accessory may be a cup holder, tray, table, box, electronics holder or other accessory holder that does not hinder emergency egress.

11. A removable adapter for adding additional accessories to an existing cup holder or armrest, comprising:
- a base having a top side and a bottom side and at least one hole therein,
- an accessory having a bottom side comprising an integral adjustment screw extending therefrom, which is fed through a corresponding hole in the base;
- a clamping mechanism which moves in relation to the movement of the adjustment screw for temporarily clamping the adapter to the existing cup holder or armrest;
- whereby when the accessory is turned in a first direction, the clamping mechanism temporarily securely mounts the adapter to the existing cup holder or armrest and whereby the adaptor may be removed by turning the accessory in a direction opposite the first direction.

12. The adapter of claim 11, wherein the accessory may be a cup holder, tray, table, box, electronics holder or other accessory holder.

13. The adapter of claim 11 wherein the clamping mechanism comprises:
- a plurality of pivot arms pivotably attached to the base and a drive hub threaded onto the integral screw and comprising arms which are movable mounted within a substantially vertical channel on the pivot arms, whereby when the accessory holder is turned in the first direction, the integral screw drives the hub to force the plurality of pivot arms to clamp the adaptor to the existing cup holder or armrest and when the accessory holder is turned in a direction opposite the first direction, the adapter is unclamped.

14. The adapter of claim 11 in which the base further comprises a mounting hole for mounting a personal display device.

15. The adapter of claim 11 in which the base further comprises holes, slots or an accessory adapter to which additional accessories or devices may be attached or mounted.

16. The adapter of claim 13 wherein each of the drive hub arms comprise at least one tooth which fits within the corresponding channel on the pivot arms.

17. The adapter of claim 13 wherein each of the drive hub arms comprise at least two teeth each of which fits within the corresponding channel on the pivot arms.

18. The adapter of claim 13 wherein each pivot arm comprises a distal end comprising a pad.

19. The adapter of claim 11 further comprising a retention device for preventing the clamping mechanism from becoming detached from the adjustment screw.

* * * * *